United States Patent
Neto et al.

(10) Patent No.: US 12,037,982 B2
(45) Date of Patent: Jul. 16, 2024

(54) TOE ANGLE CONTROL FOR MULTIROTOR WIND TURBINES

(71) Applicant: VESTAS WIND SYSTEMS A/S, Aarhus N. (DK)

(72) Inventors: Julio Xavier Vianna Neto, Skødstrup (DK); Anders Yde Wollesen, Aarhus C (DK); Søren Dalsgaard, Hadsten (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 18/009,942

(22) PCT Filed: Jun. 9, 2021

(86) PCT No.: PCT/DK2021/050180
§ 371 (c)(1),
(2) Date: Dec. 12, 2022

(87) PCT Pub. No.: WO2021/249604
PCT Pub. Date: Dec. 16, 2021

(65) Prior Publication Data
US 2023/0243334 A1 Aug. 3, 2023

(30) Foreign Application Priority Data
Jun. 12, 2020 (DK) .......................... PA 2020 70377

(51) Int. Cl.
*F03D 7/02* (2006.01)
*F03D 1/00* (2006.01)
(Continued)

(52) U.S. Cl.
CPC ............. *F03D 7/0204* (2013.01); *F03D 1/02* (2013.01); *F03D 17/00* (2016.05); *F03D 1/181* (2023.08);
(Continued)

(58) Field of Classification Search
CPC combination set(s) only.
See application file for complete search history.

(56) References Cited

U.S. PATENT DOCUMENTS

| 10,989,169 B1 * | 4/2021 | Kosuth | ................... F03D 7/028 |
| 2010/0066087 A1 * | 3/2010 | Hayashi | ................... H02P 9/00 |
| | | | 290/44 |

(Continued)

FOREIGN PATENT DOCUMENTS

| CN | 201615024 U | 10/2010 |
| EP | 3339631 A1 | 6/2018 |

(Continued)

OTHER PUBLICATIONS

Danish Patent Office, Search Opinion for Danish Patent Application No. PA 2020 70377, dated Dec. 17, 2020.
(Continued)

*Primary Examiner* — Binh Q Tran
(74) *Attorney, Agent, or Firm* — Patterson + Sheridan, LLP (57) ABSTRACT

The present invention relates to a multirotor wind turbine comprising at least two rotor nacelle assemblies mounted to a support arrangement via respective yawing systems, and a toe angle control system for controlling the toe angles of the rotor nacelle assemblies with respect to the support arrangement; wherein the toe angle control system is configured to operate in a first mode in which the rotor nacelle assemblies are held at positive toe angles while the wind turbine is generating power in a main production mode; wherein the toe angle control system is further configured to monitor the operating mode of the wind turbine, and to switch to a second mode in which the yawing systems of the rotor nacelle assemblies are operated to reduce the toe angles of the rotor nacelle assemblies if an operating mode-based trigger condition has been met.

20 Claims, 7 Drawing Sheets

(51) Int. Cl.
    *F03D 1/02*         (2006.01)
    *F03D 7/04*         (2006.01)
    *F03D 9/25*         (2016.01)
    *F03D 17/00*       (2016.01)

(52) U.S. Cl.
    CPC ............. *F03D 7/02* (2013.01); *F03D 7/04* (2013.01); *F03D 7/044* (2013.01); *F03D 7/045* (2013.01); *F03D 7/048* (2013.01); *F03D 9/257* (2017.02); *F03D 17/007* (2023.08); *F03D 17/029* (2023.08); *F05B 2240/2212* (2013.01); *F05B 2240/2213* (2013.01); *F05B 2270/32* (2013.01); *F05B 2270/321* (2013.01); *F05B 2270/329* (2013.01)

(56) References Cited

U.S. PATENT DOCUMENTS

| | | | |
|---|---|---|---|
| 2012/0279288 A1* | 11/2012 | Frederiksen | F03D 17/00 73/112.01 |
| 2013/0300115 A1* | 11/2013 | Seem | F03D 7/048 290/44 |
| 2014/0037447 A1* | 2/2014 | Attia | F03D 7/0204 416/9 |
| 2014/0271187 A1* | 9/2014 | Baker | F03D 7/024 416/37 |
| 2018/0010576 A1* | 1/2018 | Brake | F03D 7/048 |
| 2018/0017042 A1 | 1/2018 | Baun et al. | |
| 2020/0300227 A1* | 9/2020 | Evans | F03D 17/00 |

FOREIGN PATENT DOCUMENTS

| | | |
|---|---|---|
| EP | 3473851 A1 | 4/2019 |
| WO | 2016128002 A1 | 8/2016 |
| WO | 2018157897 A1 | 9/2018 |

OTHER PUBLICATIONS

Danish Patent Office, Search Report for Danish Patent Application No. PA 2020 70377, dated Dec. 17, 2020.

International Search Report and Written Opinion for PCT Application No. PCT/DK2021/050180, dated Sep. 10, 2021.

European Patent Office, Communication pursuant to Article 94(3) EPC for Application 21 733 372.3-1002 dated Apr. 12, 2023.

* cited by examiner

| | | |
|---|---|---|
| Start Up Mode | 6 Degrees | First (standard) toe angle control mode |
| Main Production Mode | 6 Degrees | |
| De-rated Production Mode | 6 Degrees | |
| High Wind Production Mode | 6 Degrees | |
| Idling Mode | 0 Degrees | Second (reduced) toe angle control mode |
| Cut Out Mode | 0 Degrees | |
| Disconnected Mode | 0 Degrees | |
| Switched Off | 0 Degrees | |

TOE ANGLE CONTROL FOR MULTIROTOR WIND TURBINES

TECHNICAL FIELD

The present invention relates to control system for a multirotor wind turbine, to a multirotor wind turbine including such a control system, and to a method of controlling a multirotor wind turbine.

BACKGROUND TO THE INVENTION

There is a general trend in the wind power industry towards the use of increasingly large wind turbines with larger rotors in order to maximise the power output from each wind turbine and thereby reduce the cost of power production.

Figure 1:
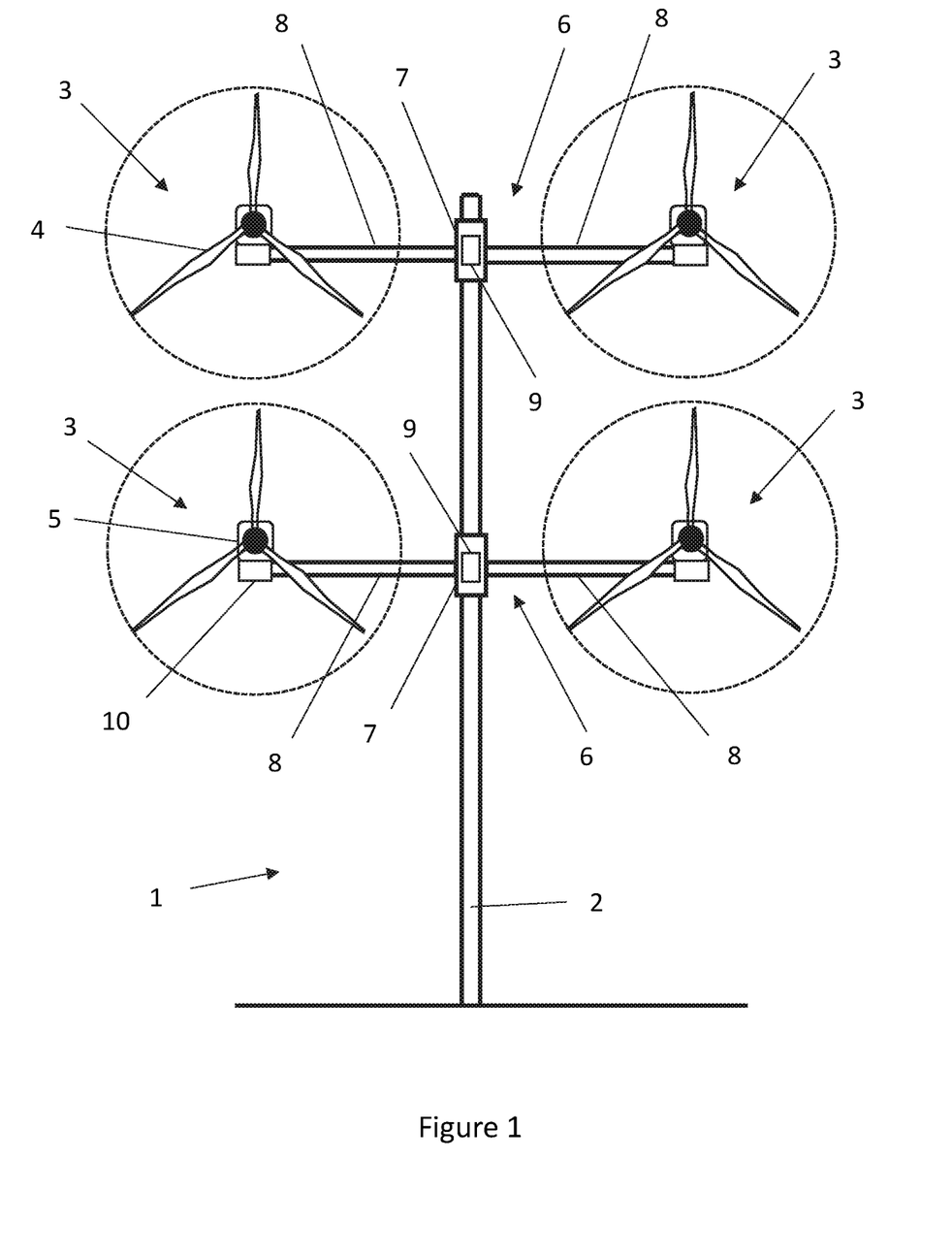
FIG. 1 schematically illustrates a multirotor wind turbine to which the present invention may be applied in accordance with one possible embodiment.

One approach for providing a large, cost-efficient wind turbine is the multirotor wind turbine (MR wind turbine), an example of which is schematically illustrated in FIG. 1. MR wind turbines 1 include multiple rotor nacelle assemblies (RNAs) 3, each of which comprises a rotor 4 and a generator housed within a nacelle 5 that is configured to generate power. The RNAs 3 are each mounted to a common tower 2 by a support arrangement 6 including one or more RNA supporting elements such as arms 8 that extend outwardly from the tower 2 in opposing directions. FIG. 1 illustrates a turbine with 4 RNAs arranged in a single layer, but other arrangements of two or more RNAs are also possible.

The support arrangement 6 may be mounted to the tower by a central yawing system 9 that is configured to change the yaw angle of the support arrangement 6 relative to the tower 2 to thereby align the RNAs 3 mounted thereto with the prevailing wind direction. The central yawing system 9 may be an active system that is configured to move the support arrangement 6 relative to the tower 2, or a passive system that is configured to use wind forces to control the angle of the support arrangement 6, as described in US2018023543 and US2019048847.

EP3339631 describes a multirotor wind turbine in which an upwind downwind facing pair of RNAs are additionally mounted to a common cross member via individual yawing systems, which are configured to yaw the RNAs relative to the cross member in order to individually tune the alignment of the RNAs with the prevailing wind direction.

Figure 2:
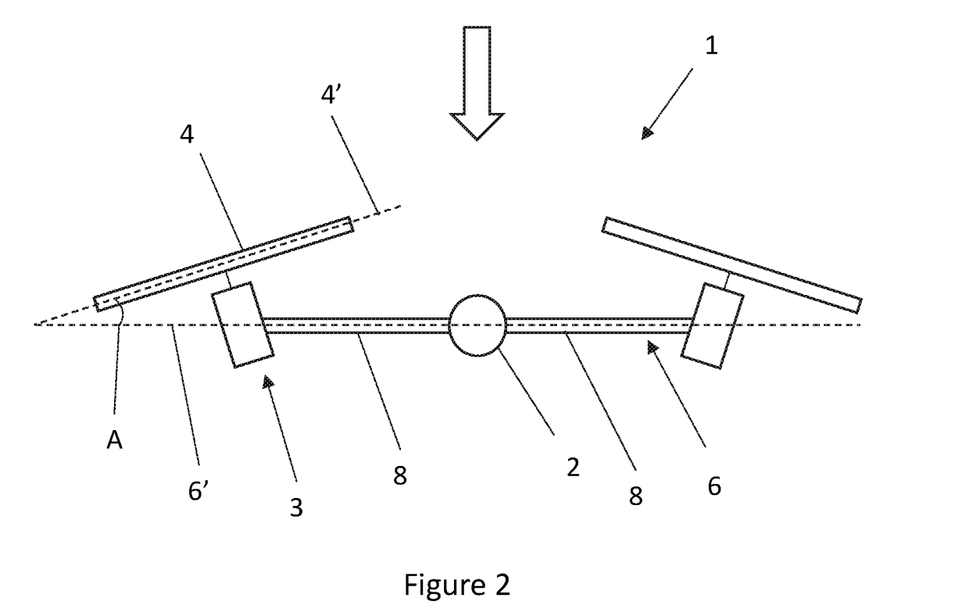
FIG. 2 schematically illustrates a plan view of the wind turbine shown in FIG. 1.

The toe angle of an RNA 3 may be defined as being the angle A in a horizontal plane between the plane 4' of the rotor 4 and the support arrangement 6, as illustrated in FIG. 2. It will be appreciated that the plane 4' of a rotor 4 is the plane in which the rotor rotates, that is a plane perpendicular to the rotor's axis of rotation. In some cases the toe angle of an RNA 3 may be measured relative to the longitudinal direction of the arm 8 to which the RNA 3 is mounted. However, where the support arms 8 do not extend within a common vertical plane, for example where the support arms 8 are angled in a windward direction, the toe angle of an RNA 3 is preferably measured relative to the plane 6' of the support arrangement 6 as a whole, that is the vertical plane that passes through the mounting points or yaw axes of the RNAs 3.

In some cases the blades of a rotor 4 may be arranged at a coning angle such that the longitudinal axes of the blades are not perpendicular to the axis of rotation of the rotor 4. For example, the blades of a rotor 4 may be angled in a windward direction away from the support arrangement 6 in order to increase the clearance between the tips of the blades and the support arrangement 6, (It will be appreciated that in such cases the plane 4' of the rotor 4 is still perpendicular to the rotor's axis of rotation, and is not affected by the coning angle of the blades.)

In order to ensure sufficient tip clearance between the tips of the blades and the support arrangement 6, RNAs 1 may also be operated at a positive toe angle, as illustrated in FIG. 2. (It will be appreciated that the size of the positive toe angle has been exaggerated in FIG. 2 for illustrative purposes.) Selecting a positive toe angle further increases tip clearance. However, the resulting increase in the yaw error between the axes of the rotors 4 and the prevailing wind direction may also result in increased loading of the rotors 4, support arrangement 6 and tower 2 in strong wind conditions.

It is against this background that the invention has been devised.

SUMMARY OF THE INVENTION

A first aspect of the present invention provides a multirotor wind turbine comprising at least two rotor nacelle assemblies mounted to a support arrangement via respective yawing systems, and a toe angle control system for controlling the toe angles of the rotor nacelle assemblies with respect to the support arrangement; wherein the toe angle control system is configured to operate in a first mode in which the rotor nacelle assemblies are held at positive toe angles while the wind turbine is generating power in a main production mode; wherein the toe angle control system is further configured to monitor the operating mode of the wind turbine, and to switch to a second mode in which the yawing systems of the rotor nacelle assemblies are operated to reduce the toe angles of the rotor nacelle assemblies if an operating mode-based trigger condition has been met.

By maintaining the rotor nacelle assemblies at positive toe angles in the first mode, the toe angle control system is able to ensure sufficient tip clearance between the tips of the blades of the rotor nacelle assemblies and the support arrangement while the wind turbine is being operated to generate power in its main production mode. However, by switching into the second mode in which the toe angles of the rotor nacelle assemblies are reduced, the toe angle control system also allows the yaw error of each rotor nacelle assembly to be minimised under certain operating conditions, for example in the case of high wind speeds. In this way the present invention is able to reduce the loads experience by the wind turbine during extreme weather conditions, thereby allowing a reduction in the weight and cost of various components of the wind turbine, including the blades.

Various different operating mode-based trigger conditions may be set for causing the toe angle control system to switch to the second mode thereby reducing the toe angles of the rotor nacelle assemblies in accordance with embodiments of the present invention. For example, the operating mode-based trigger condition may comprise any one or more of: a) the wind turbine having exited the main production mode, b) the wind turbine having entered a de-rated production mode or a high wind production mode, c) the wind turbine having entered a cut out mode or an idling mode due to high wind speeds, d) the wind turbine having entered a shut-down mode or a disconnected mode in which the wind turbine is disconnected from a grid.

In some embodiments the toe angle control system may be configured to switch to the second mode automatically whenever one or more of the above described operating or modes has been detected. However, in other embodiments the operating mode-based trigger condition may also include further requirements, at least some of which may not be directly related to the operating mode or production state of the wind turbine.

For example, the operating mode-based trigger condition may additionally comprise a windspeed-related requirement, which may result in the toe angle control system only being switched to the second mode under certain wind conditions. In this case, the toe angle control system may be configured to calculate or receive a measured or estimated windspeed, to compare the measured or estimated wind speed to a wind speed threshold, and to switch to the second mode only if the windspeed threshold has been exceeded. In one particular example the windspeed threshold may be equal to the cut-out speed of the wind turbine. However, higher windspeed thresholds may be set in other embodiments.

Alternatively, or in addition, the operating mode-based trigger condition may comprise one or more requirements related to the operating states of individual rotor nacelle assemblies. The rotor nacelle assembly operating state requirements may, for example, comprise any one or more of: power output having fallen below a threshold level, rotor speed having fallen below a threshold level, the rotor having stopped and the blades having been feathered beyond a threshold position for at least one of the rotor nacelle assemblies. In this case the toe angle control system may be configured to only switch to the second mode if certain pre-defined operating criteria have been satisfied by one or more rotor nacelle assemblies, or to only apply the second mode to rotor nacelle assemblies for which certain pre-defined operating criteria have been satisfied.

The toe angle control system may be configured to maintain an at least substantially constant toe angle for the rotor nacelle assemblies while operating in the first mode.

In this way the toe angle control system may have a particularly simple and reliable design. However, the control system may also be configured to enable yaw angle adjustments to be performed via the yawing systems of the rotor nacelle assemblies while the toe angle control system is operating in the first mode, for example in response to rapid changed in wind direction.

The toe angle control system may be configured to maintain a positive toe angle of at least 2 degrees for the rotor nacelle assemblies while operating in the first mode, and preferably a toe angle in the range 2 to 8 degrees. In one particular embodiment the toe angle control system may be configured to maintain a positive toe angle of approximately 6 degrees while operating in the first mode, although other values are also possible.

The toe angle control system may be configured to maintain an at least substantially constant toe angle of approximately 0 degrees for the rotor nacelle assemblies while operating in the second mode. It will be appreciated that a toe angle of 0 degrees also corresponds to a yaw error of 0 degrees (provided that the support arrangement has been aligned with the prevailing wind direction). It is generally advantageous for the toe angle of each rotor nacelle assembly to be as close to 0 degrees as possible once the toe angle control system has been switched to the second mode in order to keep the yaw error as close to 0 degrees as possible for each rotor nacelle assembly, thereby minimising loading of the wind turbine. However, it will be appreciated that a small positive or negative toe angle may still be present, for example a toe angle in the range −1 degree to +1 degree.

While operating in the second mode, the toe angle control system may be configured to maintain a toe angle for each rotor nacelle assembly that is smaller than the lowest toe angle permitted while the toe angle control system is operating in the first mode.

In some embodiments the yawing systems of the rotor nacelle assemblies may be locked by a locking system while the toe angle control system is operating in the first and/or second toe angle control modes in order to ensure that the rotor nacelle assemblies do not deviate from the desired toe angle.

The toe angle control system may comprise at least one data structure such as a look up table defining a plurality of toe angle reference values, and may be configured to select a toe angle reference value for each of the rotor nacelle assemblies in dependence on the operating mode of the wind turbine (and optionally further in dependence on additional requirements). The toe angle reference values may be defined relative to the plane of the support arrangement, or alternatively relative to a default yaw position, for example relative to a yaw position that is adopted while the wind turbine is operating in the main production mode. The control system may be configured to forward the selected toe angle reference values to yaw actuators of the yawing systems of the respective rotor nacelle assemblies, which may use closed loop control to maintain the rotor nacelle assemblies at the requested toe angle.

The wind turbine may further comprise a central yawing system (in addition to the individual yawing systems of the rotor nacelle assemblies) that is configured to change the yaw angle of the support arrangement relative to a base of the wind turbine. The central yawing system may be an active system or a passive system.

The central yawing system may be the primary yaw system that is used to align the rotor nacelle assemblies with the prevailing wind direction. In this case the individual yawing systems of the rotor nacelle assemblies may be used primarily for reducing the toe angles of the rotor nacelle assemblies relative to the support arrangement when the toe angle control system enters the second mode. However, as mentioned above, the individual yawing systems of the rotor nacelle assemblies may also be capable of performing additional yaw angle adjustments, for example in response to rapid changes in wind direction.

It will be appreciated that the present invention may be applied to many different types and configurations of multirotor wind turbine. For example, the wind turbine may be an onshore wind turbine or an offshore wind turbine, and may include any suitable number of rotor nacelle assemblies, for example 2, 4, 6 or more. In one particular embodiment the rotor nacelle assemblies may be mounted to the tower by one or more common support structures each including a pair of arms that extend outwardly from the tower of the wind turbine in opposing, generally horizontal directions, although other configurations are also possible.

A further aspect of the invention provides a method of operating a multirotor wind turbine comprising at least two rotor nacelle assemblies mounted to a support arrangement via respective yawing systems, the method comprising: operating the wind turbine in a main production mode in which the rotor nacelle assemblies are used to generate power; maintaining the rotor nacelle assemblies at positive toe angles while the wind turbine is operating in the main production mode; monitoring the operating mode of the wind turbine; and, in dependence on an operating mode-based trigger condition being met, operating the yawing systems of the rotor nacelle assemblies to reduce the toe angles of the rotor nacelle assemblies.

The method may generally include any steps associated with normal operation of a multirotor wind turbine as described above.

BRIEF DESCRIPTION OF THE DRAWINGS

So that it may be more fully understood, the invention will now be described, by way of example only, with reference to the following drawings, in which.

DETAILED DESCRIPTION OF EMBODIMENTS OF THE INVENTION

Figure 3:
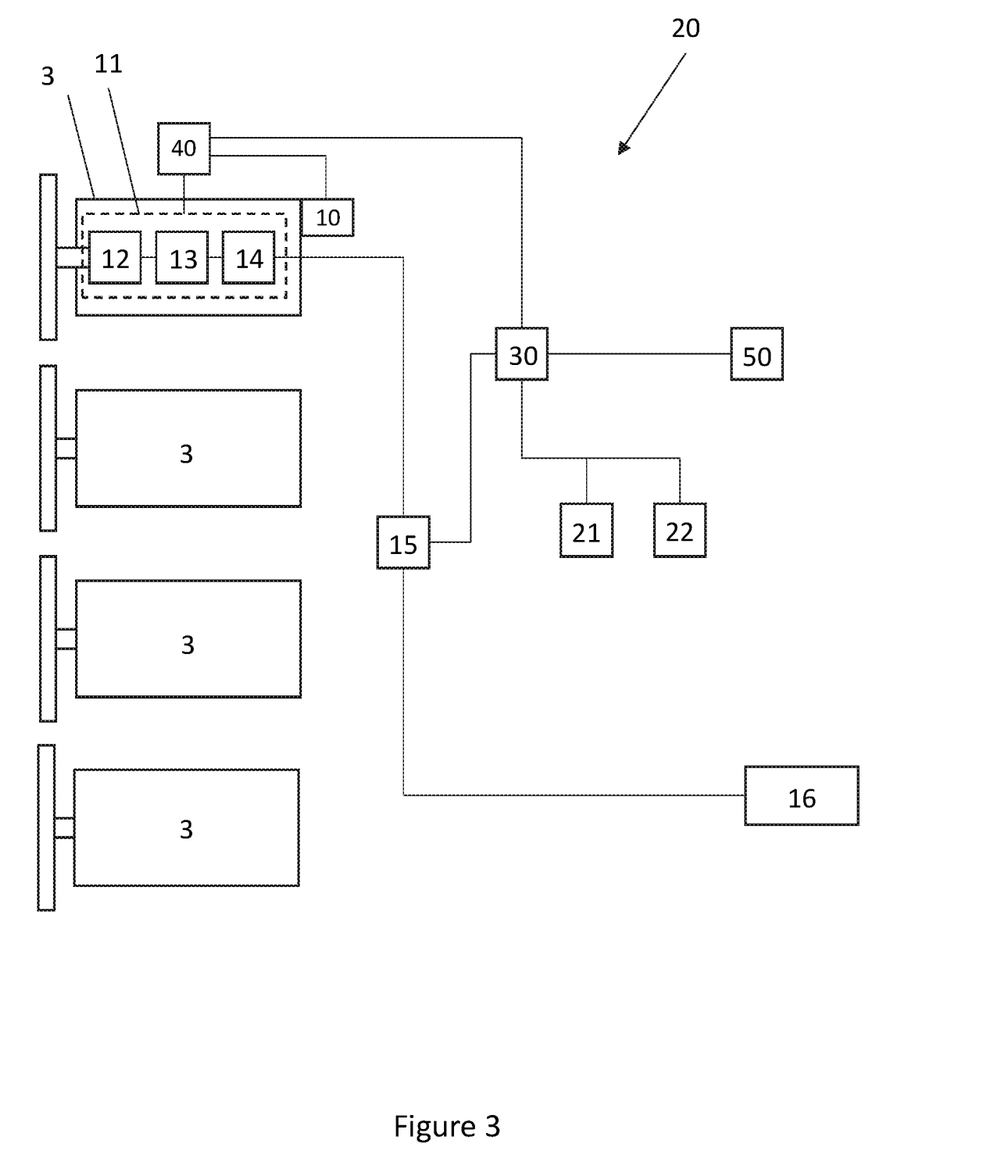
FIG. 3 schematically illustrates the system level architecture of the wind turbine shown in FIG. 1.

FIGS. 1 to 3 schematically illustrate an example of a multirotor wind turbine that is suitable for use with embodiments of the present invention. However, it mill be appreciated that the present invention may also be applied to many other types of multirotor wind turbine having different configurations to the configuration illustrated in FIGS. 1 to 3 and described below.

The multirotor wind turbine 1 illustrated in FIG. 1 comprises a tower 2 that extends upwardly in a generally vertical direction from a base. The wind turbine 1 may be either an onshore wind turbine or an offshore wind turbine, so the base of the tower 2 may be connected either to the ground or to an offshore platform.

The wind turbine 1 comprises an array of rotor nacelle assemblies (RNAs) 3 including 4 individual RNAs. Each RNA 3 comprises a windward facing HAWT-type rotor 4 that is rotatably mounted to a housing or nacelle 5 and configured to drive a generator located within the nacelle in a conventional manner, as described in more detail below.

The RNAs 3 are mounted to the tower 2 of the wind turbine 1 by a support arrangement including a pair of common support structures 6. A first one of the support structures 6 is mounted to the tower 2 adjacent to its upper end, and a second one of the support structures 6 is mounted to the tower 2 at an intermediate location along its height. Each of the support structures 6 comprises a mounting portion 7 via which the support structure 6 is mounted to the tower 2, and a pair of support elements or arms 8 that extend outwardly from the mounting portion 7 in opposing directions. Each of the arms 8 supports a respective one of the RNAs 3 at or adjacent to its distal end to thereby mount the RNAs 3 to the tower 2 of the wind turbine 1.

In the FIG. 1, each of the arms 8 is illustrated to extend outwardly from the tower 2 in a generally horizontal direction. In addition, the arms 8 of each support structure 6 are illustrated to extend in a common vertical plane, as shown in FIG. 2. However, it will be appreciated that many other configurations are also possible, as described in more detail below. For example, in other embodiments the arms 8 may be angled upwardly and/or in a forward (windward) direction.

The mounting portions 7 of the support structures 6 are each mounted to the tower 2 by respective central yawing systems 9 that are configured to enable the yaw angles of the support structures 6 to be changed with respect to the tower 2. The central yawing systems 9 provide the primary mechanism by which the RNAs 3 are aligned with the prevailing wind direction.

In addition, each RNA 3 is mounted to its respective arm 8 by an individual RNA yawing system 10. Each RNA yawing system 10 includes a mounting arrangement that supports the weight of its RNA 3 while permitting pivotal movement about a vertically extending yaw axis, and at least one yaw actuator that is operable to change the yaw angle of the RNA 3. The yawing systems 10 of the RNAs 3 are therefore able to change the toe angles of the RNAs 3 with respect to the support structures 6, as described in more detail below. In some embodiments the yawing systems 10 may additionally comprise locking systems that are configured to physically lock the yawing systems 10 in order to prevent unwanted changes in the toe angles of the RNAs 3.

FIG. 3 schematically illustrates the system level architecture of the wind turbine 1. For clarity, the major components and systems are only illustrated for a single one of the RNAs 3. However, it will be appreciated that each RNA 3 includes similar components and is configured to function in a similar manner.

As shown in FIG. 3, each RNA 3 includes a power generation system 11 including a generator 13 that is housed within the nacelle 5. The generator 13 is coupled to the rotor 4, optionally via a gearbox 12, and configured to generate power as torque is applied to the rotor 4. An output of the generator 13 is connected to a converter system 14, which converts the power generated by the generator 13 into a suitable frequency and voltage for onward transmission. A distribution unit 15 of the wind turbine 1 is configured to receive power generated by each of the RNAs 3 and to transmit the generated power to an external load 16, for example a local grid of a power plant in which the wind turbine 1 is located.

The precise configuration of the power generation system 11 and its connection to the external load 16 are not critical to the invention and so will not be discussed further. However, it will be appreciated that other suitable configurations may equally be used within the scope of the present invention.

As also shown in FIG. 3, the wind turbine 1 comprises a central controller 30 that is configured to control overall operation of the wind turbine 1. In addition, each RNA 3 is also provided with its own local controller 40 that is configured to control operation of its respective RNA 3. The central controller 30 and local controllers together form the overall control system 20 of the wind turbine 1.

The central controller 30 and the local controllers 40 each comprise a plurality of processing units and memory modules, which may be collected together at discrete locations or alternatively distributed across a plurality of locations within the wind turbine. In the present embodiment the central controller 30 is provided in the tower 2 of the wind turbine 1 and the local controllers 40 are provided in the nacelles 5 of the respective RNAs 3. However, in other embodiments the central controller 30 and the local controllers 40 may be provided at other suitable locations. In addition, in other embodiments some or all of the functions of the local controllers 40 may be performed by the central controller 30, in which case at least portions of the local controllers 40 may be integrated with the central controller 30.

The central controller 30 is connected to and configured to receive input signals from a wind park controller 50 as well as a plurality of sensors associated with the wind turbine 1. The sensors include at least one wind speed sensor 21 and at least one wind direction sensor 22. The wind speed sensor(s) 21 and the wind direction sensor(s) 22 may be provided on the wind turbine 1, for example on one or more of the RNAs 3 or towards the upper end of the tower 2, or alternatively at another suitable location in the vicinity of the wind turbine 1. The central controller 30 is, of course, also connected to a large number of other sensors including speed sensors and load sensors, among others. However, these additional sensors have been omitted from FIG. 3 for clarity.

The central controller 30 is configured to control operation of the wind turbine 1 in dependence on the received input signals. For example, the central controller 30 is configured to receive power demand signals from the wind park controller 50, and to control the power output of the wind turbine 1 via the local controllers 40 of the RNAs 3 in order to meet the received power demand. In addition, the central controller 30 is also configured to receive a signal representative of the prevailing wind direction from the wind direction sensor 22, and to control operation of the central yawing systems 9 to yaw the support structures 6 with respect to the tower 2 in order to align the RNAs 3 with the prevailing wind direction.

The control system 20 of the wind turbine 1 includes a toe angle control system or yaw control system 100 that is configured to control the toe angles or yaw angles of the RNAs 3 with respect to the support structures 6 in accordance with one possible embodiment of the present invention. The toe angle control system 100 is schematically illustrated in FIG. 4.

Figure 4:
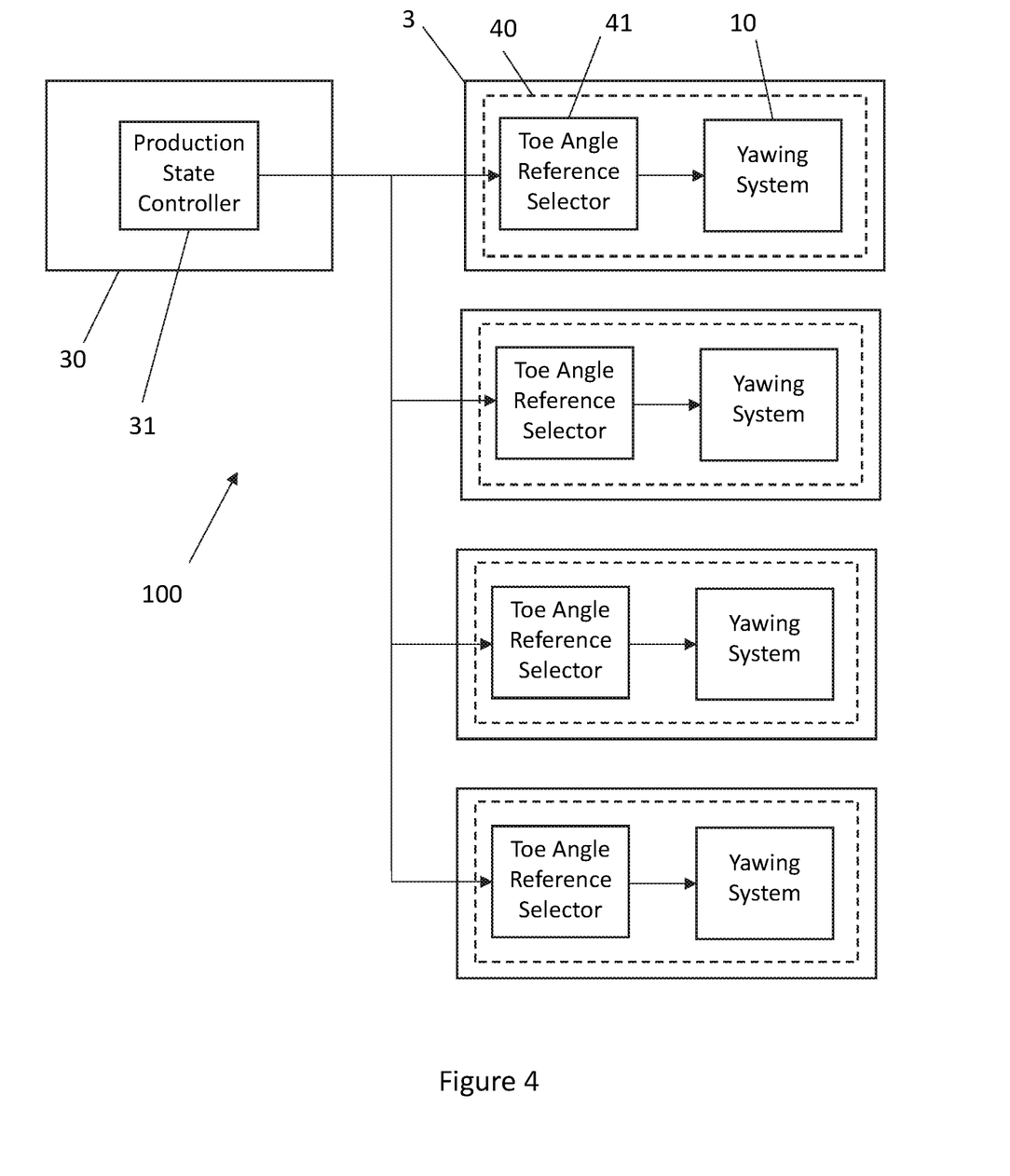
FIG. 4 schematically illustrates a toe angle control system forming part of the overall control system of the wind turbine shown in FIG. 1.

For clarity, only the portions of the overall control system 20 that are directly involved in controlling the toe angles of the RNAs 3 are illustrated in FIG. 4, and the remaining sensors and controllers have been omitted. However, it will be appreciated that the overall control system 20 also includes other controllers and sensors, some of which may communicate with one or more of the elements of the toe angle control system 100 illustrated in FIG. 4.

As shown in FIG. 4, the central controller 30 of the wind turbine 1 comprises a production state controller 31. The production state controller 31 is configured to set the operating mode or production mode of the wind turbine 1. Selectable modes may include, for example, a start-up mode, a main production mode, a de-rated production mode, a high wind production mode, a high wind idling mode, a cut out mode, a grid off/disconnected mode, and a shut-down/power off mode. For example, the production state controller 31 is configured to select the main production mode if the wind turbine 1 has been instructed to generate power and the current wind speed is above the cut in speed but below the cut out speed of the wind turbine 1; and to select the cut out mode if the wind turbine 1 is switched on by the current wind speed is above the cut out speed. The production state controller 31 is further configured to communicate the selected operating mode to other portions of the control system 20 to thereby ensure that the wind turbine 1 operates in the desired mode.

As also shown in FIG. 4, the local controller 40 of each RNA 3 comprises a toe angle reference selector 41. Each toe angle reference selector 41 is configured to receive an indication of the current operating mode or production mode from the production state controller 31, and to set a toe angle reference value for its respective RNA 3 in dependence on the communicated operating mode. Each toe angle reference selector 41 is further configured to communicate the selected toe angle reference value to its respective RNA yawing system 10, which applies closed loop control to maintain the RNA 3 at the toe angle value specified by the toe angle reference selector 41.

In accordance with one possible embodiment of the present invention, each toe angle reference selector 41 comprises a look up table 42 that is configured to set the toe angle of its respective RNA 3. A simplified example of such a look up table 42 is illustrated in FIG. 5.

Figure 5:
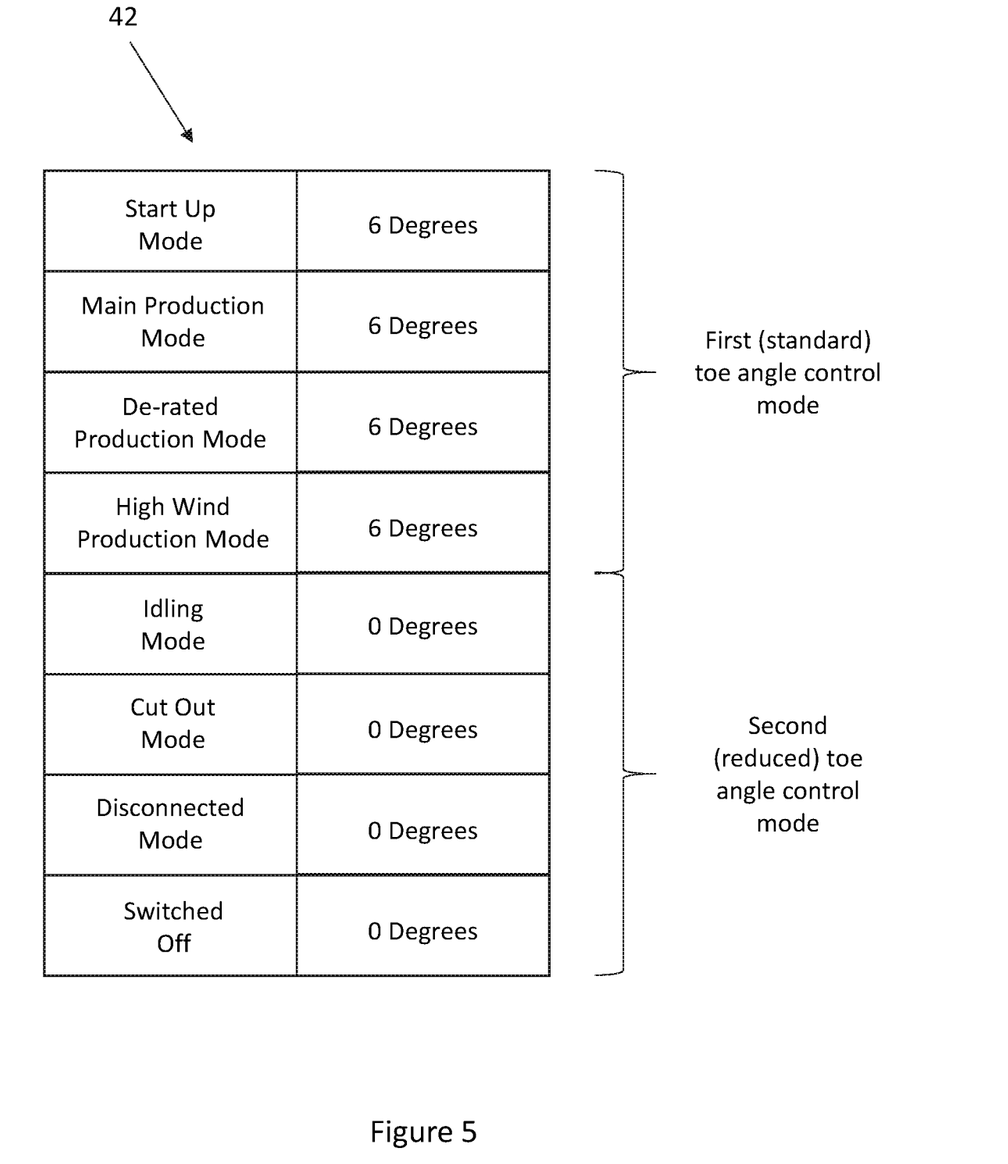
FIG. 5 illustrates a simplified example of a look up table that may be used in accordance with one possible embodiment of the present invention.

As shown in FIG. 5, each toe angle reference selector 41 is configured to operate in one of two selectable modes: a first mode or normal toe angle control mode, in which the toe angle reference value is fixed at 6 degrees; and a second mode or reduced toe angle mode, in which the toe angle reference value is fixed at 0 degrees. As also shown in FIG. 5, each toe angle reference selector 41 is configured to switch between its first and second modes in dependence on the current operating mode of the wind turbine 1.

Figure 6A:
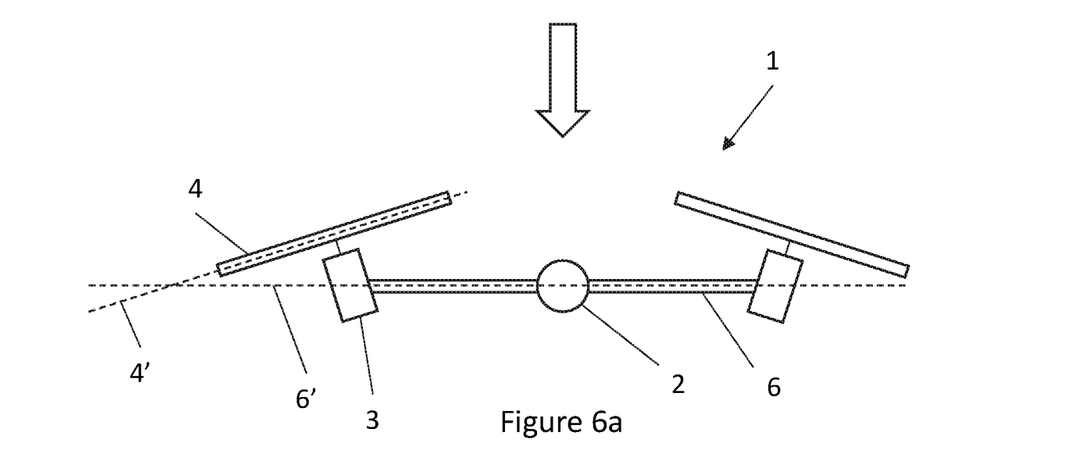
FIGS. 6*a* and 6*b* schematically illustrate a plan view of the wind turbine of FIG. 1 operating in different toe angle control modes.

For example, if the wind turbine 1 is currently operating in the main production mode then this information is communicated to the toe angle reference selectors 41. Since the main production mode corresponds to the first toe angle control mode, the toe angle reference selectors 41 communicate a toe angle reference value of 6 degrees to the yawing systems 10 of the RNAs 3. This causes the yawing systems 10 to maintain the RNAs 3 at a toe angle of 6 degrees, as schematically illustrated in FIG. 6a. If the yawing systems 10 are provided with locking systems then the locking systems may be engaged in order to prevent unwanted changes in the toe angles of the RNAs 3. In this way the toe angle control system is able to ensure that sufficient tip clearance is maintained between the tips of the blades of the RNAs 3 and the support structures 6 while the wind turbine 1 is operating in the main production mode.

Figure 6B:
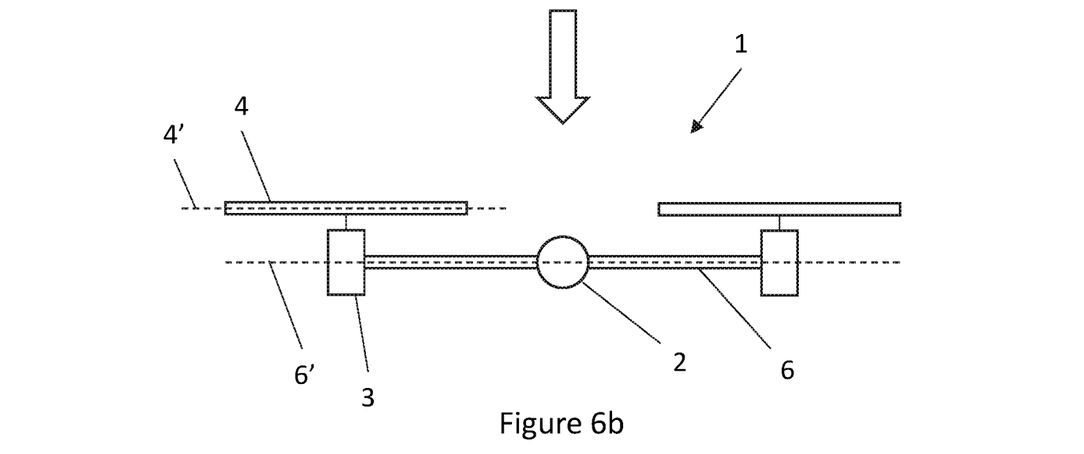

However, if the production state controller 31 switches the wind turbine 1 to the cut out mode due to the wind speed having exceeded the cut out speed of the wind turbine 1, then this information is communicated to the toe angle reference selectors 41, Since the wind turbine 1 having exited the main production mode and entered the cut out mode satisfies an operating mode based trigger condition for switching the toe angle control system 100 to the second toe angle control mode, the toe angle reference selectors 41 will then operate in accordance with the second toe angle control mode and communicate a toe angle reference value of 0 degrees to the yawing systems 10 of the RNAs 3. This causes the yawing systems 10 to move the RNAs 3 into a reduced toe angle state, as schematically illustrated in FIG. 6b. In this way the toe angle control system 100 is able to reduce the toe angles of the RNAs 3, thereby also reducing the yaw error of the RNAs, whenever the cut out speed of the wind turbine 1 is exceeded.

If the yawing systems 10 are provided with locking systems then the locking systems may be disengaged when the toe angle control system 100 switches from the first toe angle control mode to the second toe angle control mode, and reengaged once the RNAs 3 have reached the desired toe angle, thereby preventing unwanted changes to the toe angles of the RNAs 3 while the toe angle control system 100 remains in the second toe angle control mode.

As shown in FIG. 5, the toe angle reference selectors 41 are also configured to switch to the second toe angle control mode, thereby reducing the toe angle each RNA 3, when the wind turbine 1 is disconnected from a local or external grid and when the wind turbine 1 is switched off. In this case operation of the toe angle control system 100 and RNA yawing systems 10 may be powered by an emergency power supply.

In this way it may be ensured that the RNAs 3 are left in a reduced toe angle state when the wind turbine is switched off.

When the wind turbine returns 1 to the start-up mode or to one of its production modes, the toe angle control system 100 then switches back to the first toe angle control mode, in which the toe angles of the RNAs are set back to 6 degrees in order to ensure sufficient tip clearance between the tips of the blades of the RNAs 3 and the support structures 6.

In some cases the control system 20 of the wind turbine 1 may be configure to inhibit operation of the wind turbine 1 in certain modes until the RNAs 3 have reached their intended yaw angle positions. For example, when the wind turbine 1 enters the start up mode, the rotors 4 may be prevented from restarting until after the RNAs 3 have reached a yaw angle of 6 degrees as specified for the start up mode.

The above-described example has been included in order to facilitate understanding of the present invention. However, it will be appreciated that many modifications and variations may be made within the scope of the appended claims.

For example, in the above-described embodiment each RNA 3 comprises a local controller 40 comprising its own toe angle reference selector 41 that is configured to set the toe angle reference value for that RNA 3. However, in other embodiments the toe angle control system 100 may not include separate toe angle reference selectors 41 for each individual RNA 3. For example, the central controller 30 may include a common toe angle reference selector, which may be configured to set a toe angle reference value for each RNA 3, and to communicate the selected toe angle reference value to the yawing systems 10 of each RNA 3.

In the above-described embodiment the toe angle control system 100 is only configured to switch to the second toe angle control mode when the wind turbine 1 is idling, has cut out, is disconnected or has been switched off. However, in another embodiment the second toe angle control mode may also be engaged when the wind turbine is operating in the de-rated production mode and/or in the high wind production mode, in which case the look up table 42 illustrated in FIG. 5 may also specify a toe angle reference value of 0 degrees for these operating modes.

In addition, in the above-described embodiment the toe angle control system 100 is configured to switch between the first and second toe angle control modes based only on the operating mode or production mode of the wind turbine 1. However, in other embodiments the trigger condition for entering the second toe angle control mode and thereby reducing the toe angles of the RNAs 3 may also include further requirements related to the operating states of individual RNAs 3. For example, the toe angle control system 100 may be configured to only enter the second mode if certain criteria have been satisfied for each RNA 3, or to only apply the second mode to RNAs 3 for which certain criteria have been satisfied. Examples of such criteria may include, for example, power output having fallen below a threshold level, rotor speed having fallen below a threshold level, the rotor having stopped and/or the blades having been feathered beyond a threshold position.

In some embodiments the trigger condition for entering the second toe angle control mode may additionally comprise a windspeed-related requirement in order to prevent the RNAs 3 from being yawed into their reduced yaw angle states unless the wind turbine 1 is experiencing high wind speeds. For example the toe angle control system 100 may be configured to calculate or receive a measured or estimated windspeed, for example from the wind speed sensor 21, to compare the measured or estimated wind speed to a wind speed threshold, and to switch to the second mode only if the windspeed threshold has been exceeded.

In the above-described embodiment the toe angle control system is configured to maintain the RNAs 3 at a fixed toe angle of 6 degrees while operating in the first toe angle control mode, and at a fixed toe angle of 0 degrees while operating in the second toe angle control mode. However, in other embodiments the toe angles of the RNAs 3 may also be varied while the toe angle control system 100 is operating in the first and/or second toe angle control modes, for example in response to changes the operating mode of the wind turbine 1 or in response to changing operating conditions such as wind speed or wind direction. In this case the toe angle reference selectors 41 may store a plurality of different toe angle reference values within the first and/or second toe angle control modes, which may be selected in dependence on the current operating mode or wind conditions.

In addition, the toe angle control system 100 may also be configured to reduce the toe angles of the RNAs in response to other situations besides those described above, for example during maintenance or when one or more of the RNAs is non-functional.

In the above-described embodiment the present invention is applied to a wind turbine 1 comprising an array of four RNAs 3 that are mounted to a vertical tower 2 via a pair of support structures 6 each including a pair of arms 8 that extend outwardly from the tower 2 in generally horizontal directions within a common vertical plane. However, it will be appreciated that the invention may also be applied to wind turbines having different numbers of RNAs 3 and/or different support arrangement configurations. For example, in other embodiments the arms 8 may each be angled upwardly or downwardly as they extend away from the tower 2, or may be angled in a windward or leeward direction.

Figure 7A:
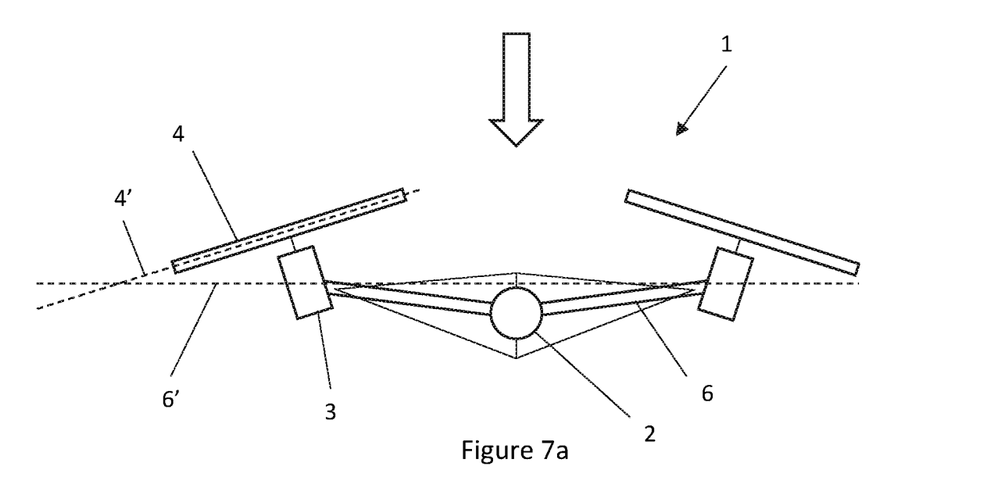
FIGS. 7*a* and 7*b* schematically illustrate a plan view of a further multirotor wind turbine to which the present invention may be applied in different toe angle control modes.
Figure 7B:
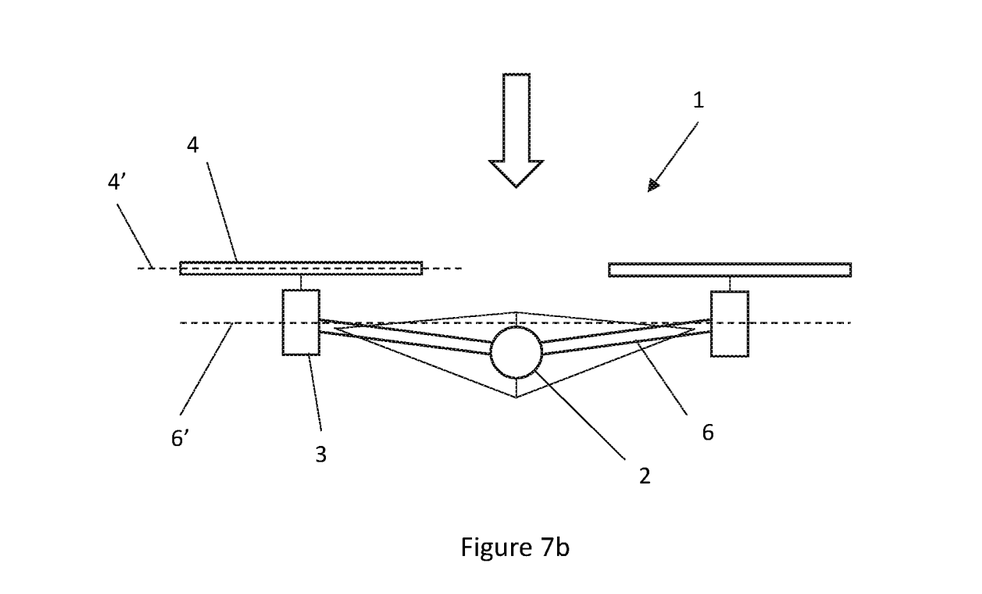

FIGS. 7a and 7b schematically illustrate plan views of a further multirotor wind turbine to which the present invention may be applied in accordance with another possible embodiment of the present invention. The wind turbine illustrated in FIGS. 7a and 7b is generally similar to the wind turbine 1 described above in connection with FIGS. 1 and 2, and so the same reference numbers are used to identify equivalent features of the wind turbine 1. However, as shown in FIGS. 7a and 7b, the arms 8 of this alternative wind turbine 1 do not extend in a common vertical plane, but are instead angled in a windward direction. In addition, the arms 8 are reinforced by a supporting wires, which help to reduce the stress placed on the mounting portions 7 and the arms 8 of the support structures 6. (These supporting wires are not illustrated in FIGS. 1 and 2, but may also be included in the wind turbine of FIGS. 1 and 2, if necessary.)

Although the configuration of the wind turbine 1 illustrated in FIGS. 7*a* and 7*b* is different to that of the wind turbine illustrated in FIGS. 1 and 2, the RNAs 3 may still be configured to be selectively switched between a positive toe angle state, as shown in FIG. 7*a*, and a reduced toe angle state, as shown in FIG. 7*b*, in an equivalent manner. However, since the arms 8 of this alternative wind turbine 1 do not extend in a common vertical plane, the toe angles of the RNAs 3 are preferably measured relative to the plane 6' of the support structures 6 (that is the vertical plane in which the yaw axes of the RNAs 3 lie) and not relative to the longitudinal directions of the individual arms 8.

Other modifications and variations, including other physical configurations for the multirotor wind turbine will also be apparent to the skilled person.

The invention claimed is:

1. A multirotor wind turbine comprising at least two rotor nacelle assemblies mounted to a support arrangement via respective yawing systems, and a toe angle control system for controlling toe angles of the rotor nacelle assemblies with respect to the support arrangement;
wherein the toe angle control system is configured to operate in a first mode in which the rotor nacelle assemblies are held at positive toe angles while the multirotor wind turbine is generating power in a main production mode; and
wherein the toe angle control system is further configured to monitor an operating mode of the multirotor wind turbine, and to switch to a second mode in which the yawing systems of the rotor nacelle assemblies are operated to reduce the toe angles of the rotor nacelle assemblies when an operating mode-based trigger condition has been met.

2. The multirotor wind turbine according to claim 1, wherein the operating mode-based trigger condition comprises the multirotor wind turbine having exited the main production mode.

3. The multirotor wind turbine according to claim 1, wherein the operating mode-based trigger condition comprises the multirotor wind turbine having entered a de-rated production mode or a high wind production mode.

4. The multirotor wind turbine according to claim 1, wherein the operating mode-based trigger condition comprises the multirotor wind turbine having entered a cut out mode or an idling mode.

5. The multirotor wind turbine according to claim 1, wherein the operating mode-based trigger condition comprises the multirotor wind turbine having entered a shutdown mode or a disconnected mode.

6. The multirotor wind turbine according to claim 1, wherein the operating mode-based trigger condition comprises a windspeed-related requirement.

7. The multirotor wind turbine according to claim 6, wherein the windspeed-related requirement comprises a measured or estimated wind speed having exceeded a wind speed threshold.

8. The multirotor wind turbine according to claim 1, wherein the operating mode-based trigger condition comprises one or more requirements related to operating states of individual rotor nacelle assemblies.

9. The multirotor wind turbine according to claim 8, wherein the rotor nacelle assembly operating state requirements comprise one or more of: a power output having fallen below a threshold level, a rotor speed having fallen below a threshold level, the rotor having stopped and blades thereof having been feathered for at least one of the rotor nacelle assemblies.

10. The multirotor wind turbine according to claim 1, wherein the toe angle control system is configured to maintain an at least substantially constant toe angle for the rotor nacelle assemblies while operating in the first mode.

11. The multirotor wind turbine according to claim 1, wherein the toe angle control system is configured to maintain a positive toe angle in a range of 2 to 8 degrees for the rotor nacelle assemblies while operating in the first mode.

12. The multirotor wind turbine according to claim 1, wherein the toe angle control system is configured to maintain an at least substantially constant toe angle of approximately 0 degrees for the rotor nacelle assemblies while operating in the second mode.

13. The multirotor wind turbine according to claim 1, wherein the toe angle control system is configured, while operating in the second mode, to maintain a toe angle for each rotor nacelle assembly that is smaller than the lowest toe angle permitted while the toe angle control system is operating in the first mode.

14. The multirotor wind turbine according to claim 1, wherein the toe angle control system comprises at least one data structure defining a plurality of toe angle reference values, and is configured to select a toe angle reference value for each of the rotor nacelle assemblies in dependence on the operating mode of the multirotor wind turbine.

15. The multirotor wind turbine according to claim 1, further comprising a central yawing system that is configured to change a yaw angle of the support arrangement relative to a base of the multirotor wind turbine.

16. A method of operating a multirotor wind turbine comprising at least two rotor nacelle assemblies mounted to a support arrangement via respective yawing systems, the method comprising:
operating the multirotor wind turbine in a main production mode in which the rotor nacelle assemblies are used to generate power;
maintaining the rotor nacelle assemblies at positive toe angles while the multirotor wind turbine is operating in the main production mode;
monitoring an operating mode of the multirotor wind turbine; and,
in dependence on an operating mode-based trigger condition being met, operating the yawing systems of the rotor nacelle assemblies to reduce the toe angles of the rotor nacelle assemblies.

17. The method of claim 16, wherein the operating mode-based trigger condition comprises the multirotor wind turbine having exited the main production mode.

18. The method of claim 17, wherein the operating mode-based trigger condition comprises the multirotor wind turbine having entered a de-rated production mode or a high wind production mode.

19. A non-transitory computer readable storage medium comprising computer readable instructions which, when executed by one or more computer processors, performs an operation of a multirotor wind turbine comprising at least two rotor nacelle assemblies mounted to a support arrangement via respective yawing systems, the operation, comprising:
operating the multirotor wind turbine in a main production mode in which the rotor nacelle assemblies are used to generate power;
maintaining the rotor nacelle assemblies at positive toe angles while the multirotor wind turbine is operating in the main production mode;
monitoring an operating mode of the multirotor wind turbine; and, in dependence on an operating mode-based trigger condition being met, operating the yawing systems of the rotor nacelle assemblies to reduce the toe angles of the rotor nacelle assemblies.

20. The non-transitory computer readable storage medium of claim 19, wherein the operating mode-based trigger condition comprises the multirotor wind turbine having exited the main production mode.

* * * * *